United States Patent [19]

Ogawa et al.

[11] Patent Number: 4,851,067

[45] Date of Patent: Jul. 25, 1989

[54] METHOD FOR PRODUCING A WEATHER STRIP FOR AN AUTOMOBILE

[75] Inventors: Kazuo Ogawa; Masaki Oohashi; Tomoyuki Kamiya, all of Shuchi, Japan

[73] Assignee: Toyoda Gosei Co., Ltd., Nishikasugai, Japan

[21] Appl. No.: 132,161

[22] Filed: Dec. 11, 1987

[30] Foreign Application Priority Data

Mar. 25, 1987 [JP] Japan ................................ 62-70732
Mar. 31, 1987 [JP] Japan ................................ 62-80749

[51] Int. Cl.⁴ ............................................. B29C 65/00
[52] U.S. Cl. ........................... 156/244.18; 156/244.24; 156/244.25; 264/146; 264/152; 264/167; 264/177.1; 264/177.17
[58] Field of Search ................... 156/242, 64, 244.12, 156/244.18, 244.24, 244.25; 264/177.1, 177.16, 167, 145, 177.17, 347, 146, 177.19, 152; 425/465

[56] References Cited

U.S. PATENT DOCUMENTS

| | | | |
|---|---|---|---|
| 1,702,123 | 2/1929 | Matthias | 156/244.24 |
| 3,068,136 | 12/1962 | Reid | 264/151 |
| 3,416,986 | 12/1968 | Carley | 264/146 |
| 3,825,459 | 7/1974 | Taylor | 264/145 |
| 3,837,957 | 9/1974 | Mesnel | 264/347 |
| 4,534,724 | 8/1985 | Fischer et al. | 264/167 |
| 4,576,773 | 3/1986 | Azzola et al. | 264/167 |
| 4,722,818 | 2/1988 | Zoller | 264/177.2 |

FOREIGN PATENT DOCUMENTS

| | | | |
|---|---|---|---|
| 2175673 | 10/1973 | France | 156/244.25 |
| 55-79114 | 6/1980 | Japan | 156/242 |
| 59-76237 | 5/1984 | Japan | 264/167 |
| 59-76238 | 5/1984 | Japan | 264/167 |
| 59-78837 | 5/1984 | Japan | 264/167 |
| 60-31937 | 2/1985 | Japan | 264/177.1 |

Primary Examiner—Jeffery Thurlow
Attorney, Agent, or Firm—Cushman, Darby & Cushman

[57] ABSTRACT

A method for producing a weather strip of which the sectional shape is continuously changed in its longitudinal direction, has the steps of simultaneously extruding two rubber members out of two outlet ports formed in an extrusion head of an extruder so as to be close to and parallel with each other, each of the two rubber members having a uniform sectional shape in each longitudinal direction, corresponding to each of two pieces obtained by cutting the weather strip in its longitudinal direction, overlapping opposed side portions of the two extruded rubber members, joining the overlapped portion to obtain a joined weather strip of which the sectional shape is continuously changed in its longitudinal direction, and feeding the joined weather strip into a vulcanizing bath to be vulcanized. The overlapping step and the joining step are performed by feeding the two extruded rubber members between a receiving roller disposed in front of the extruding outlets, and a pressing roller disposed directly above the receiving roller. The receiving roller has a guide groove in its outer periphery, of which the width is changed in the peripheral direction of the roller, and the pressing roller presses the overlapped portion of the two extruded rubber members within the guide groove of the receiving roller.

10 Claims, 6 Drawing Sheets

METHOD FOR PRODUCING A WEATHER STRIP FOR AN AUTOMOBILE

BACKGROUND OF THE INVENTION

1. Field of the Invention

The present invention relates to a weather strip employed in an automobile, and more particularly to a method for producing a weather strip of which the sectional shape is changed in its longitudinal direction.

2. Description of the Prior Art

Weather strips are mounted along a door frame of an automobile, and along a door opening of an automobile body, which is to be closed by a door. And when the gap between the member on which the weather strip is mounted and the member to be sealed by the weather strip is locally or continuously changed or when the contacting state of the weather strip is locally or continuously changed, there has been used the weather strip of which the sectional shape is changed in its longitudinal direction.

For obtaining the above described weather strip, there has been proposed such means as to change the shape and area of an outlet port of an extrusion head by means of a slidable shutter or the like (Japanese unexamined Patent Publications Nos. Sho 59-114040, Sho 59-160677, and Sho 59-171735)

However, in this means, the supply of rubber material for the weather strip must be adjusted in accordance with the change of the area and the shape of the outlet port. The mechanism of this adjustment is complex and the sectional shape cannot be precisely changed to a desired one.

SUMMARY OF THE INVENTION

An object of the present invention is to provide a method for changing the sectional shape of the weather strip in the extruding process without using any complex mechanism, which method does not require any adjustment of the supply of material.

In a first method according to the present invention, two rubber members, each having a uniform sectional shape in each longitudinal direction, are simultaeously extruded out of two outlet ports of an extrusion head so as to be close to and parallel with each other. The two other members have shapes corresponding to two pieces obtained by cutting the weather strip in its longitudinal direction. Then, opposed side portions of extruded two rubber members are overlapped with each other and fed while the width of the overlapped portion is continuously changed. And in this process, the overlapped portion is pressed so that the two rubber members are joined in the overlapped portion. Then, the joined members are fed to a vulcanizing bath and vulcanized therein.

The width of the overlapped portion of the two members is changed as follows, for example:

Namely, a receiving roller having a guide groove of which the width is changed, on the outer periphery thereof is provided. And this guide groove guides the two members directly after the extruding process. The two members guided along both side edges of the guide groove, approach and separate from each other. This results in the width of the overlapped portion of the two members being changed. Next, the two members are joined in the overlapped portion by pressing them by means of a pressing roller, for example.

The joined members are fed to a vulcanizing bath. As a result, the weather strip of which the sectional shape is changed, is obtained.

In a second method according to the present invention, a weather strip having a uniform sectional shape in its longitudinal direction is extruded out of an extruder. The extruded weather strip is fed to a cutter and the transversely intermediate portion thereof is continuously cut off from the extruded weather strip by the width which is continuously changed in the longitudinal direction of the extruded weather strip, whereby the extruded weather strip is separated in the longitudinal direction thereof. Next, opposed side surfaces of the separated weather strip, are successively touched and joined to each other. The joined weather strip is fed to a vulcanizing bath and vulcanized therein.

According to the second method, the weather strip of which the sectional shape is changed in its longitudinal direction is obtained by changing the cutting portion and the width of the portion to be cut off from the extruded weather strip.

BRIEF DESCRIPTION OF THE DRAWINGS

FIG. 3 is a system view illustrating the extrusion process of the weather strip;

FIG. 4 is a front view of an extrusion head;

FIGS. 5 and 6 are sectional views, each illustrating the pressed state of the weather strip by means of rollers;

FIG. 7 is a view illustrating a receiving roller and the developed shape of the outer peripheral surface of the receiving roller;

FIG. 8 is a system view illustrating the extrusion process of the weather strip;

FIG. 9 is a view illustrating the state before the cutting process;

FIG. 10 is a view illustrating the state where one portion of the weather strip is cut off;

FIG. 11 illustrates the state where the cut weather strip is fed to the rollers;

FIG. 12 is a view illustrating the state where one portion of the weather strip is largely cut off;

FIG. 13 is a view illustrating the state where the largely cut weather strip is fed to the rollers; and FIG. 14 is a view illustrating the receiving roller and the developed shape of the outer periphery of the receiving roller.

BRIEF DESCRIPTION OF THE DRAWINGS

Figure 1:
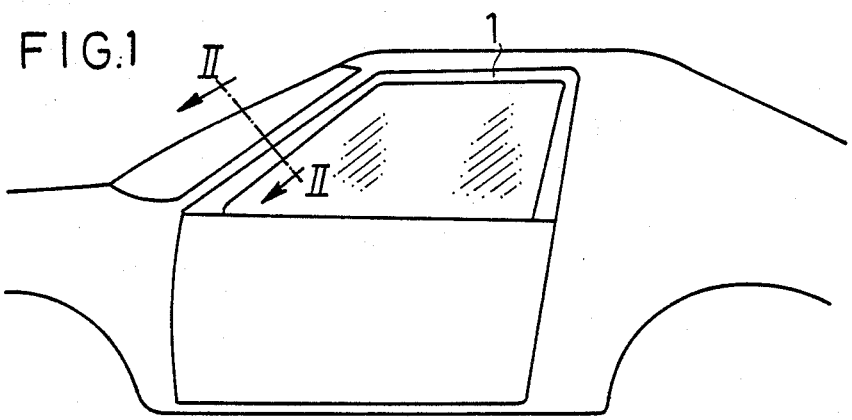
FIG. 1 is a perspective view of one portion of an automobile.
Figure 2:
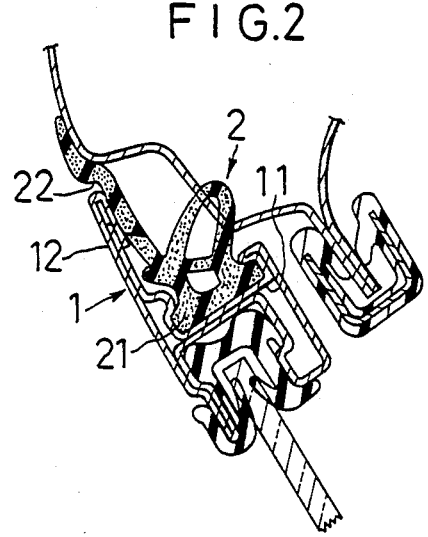
FIG. 2 is a sectional view of a weather strip to which the present invention is applied, taken along the line of II-II of FIG. 1.

A first method of the present invention will be explained in accordance with the embodiment wherein a weather strip 2 mounted along a door frame 1 as shown in FIGS. 1 and 2, is produced.

As shown in FIG. 2, the weather strip 2 is an extruded body made of sponge rubber, and is provided with a main body portion 21, including a hollow seal portion, and a seal lip 22. The main body portion 21 is retained by an outer peripheral surface 11 of the door frame 1. The height of the seal lip 22 is changed in accordance wtih the change of the height of the projecting edge 12 of the door frame 1.

The first method for producing this weather strip will be explained with reference to FIGS. 3 through 7.

Figure 3:
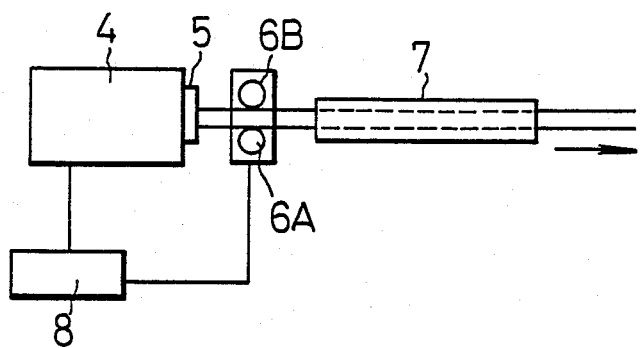
FIGS. 3 through 7 illustrate a first method according to the present invention.
Figure 4:
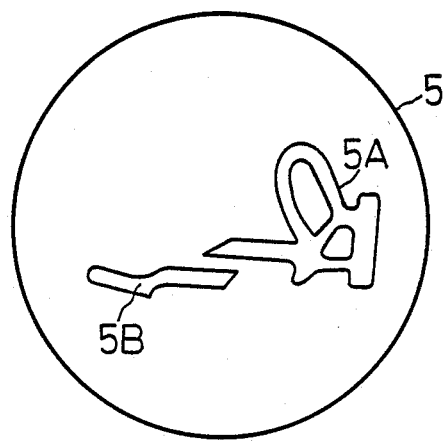
Figure 5:
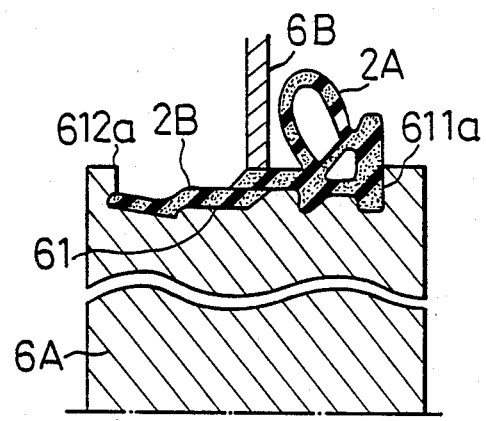
Figure 6:
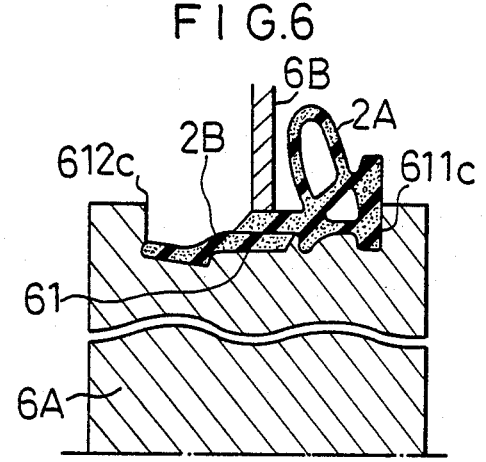
Figure 7:
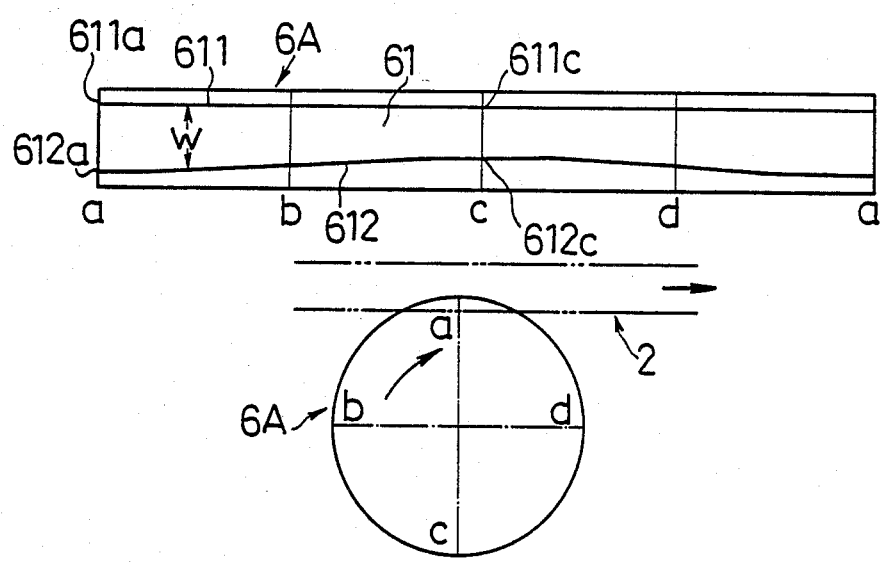

As shown in FIG. 4, an outlet port 5A for extruding the main body portion 21 including a root portion of the seal lip 22, and an outlet port 5B for extruding the seal lip 23 are separately formed in an extrusion head 5 of an extruder 4 so as to be close to each other. And one portion of the outlet port 5A, corresponding to the seal lip root portion is positioned so as to be overlapped with one portion of the outlet port 5B, corresponding to the seal lip base end. From these outlet ports 5A and 5B are simultaneously extruded sponge rubber members 2A and 2B (FIGS. 5 and 6) in parallel with each other. As shown in FIG. 3, in front of the extrusion head 5 are installed a receiving roller 6A and a pressing roller 6B so as to be close thereto. And as shown in FIG. 5, a guide groove 61 is formed in the peripheral surface of the receiving roller 6A for receiving the members 2A and 2B and adjusting the mutual positional relation thereof. The width(W) of the guide groove 61 is made smaller than the total width of the members 2A and 2B and is continuously changed in the peripheral direction of the roller 6A as shown in FIG. 7. In the drawing, the reference characters a through d represent the positions on the outer periphery of the roller 6A, respectively.

One side edge 611 defining the guide groove 61 straightly extends while the other side edge 612 curves approaching or separating from the side edge 611.

The extruded members 2A and 2B are fed to the rotating receiving roller 6A. And the member 2A is received by the guide groove 61 on the side of the side edge 611 and the member 2B is received by the guide groove 61 on the side of the side edge 612 at the uppermost position of the receiving roller 6A. The width(W) of the guide groove 61 at the uppermost position of the receiving roller 6A, at which the members 2A and 2B are received, is continuously changed due to the rotation of the receiving roller 6A. FIG. 5 illustrates the positional relation of the members 2A and 2B at the time when 611a—612a portion as shown in FIG. 7 receives them at the uppermost position of the roller 6A. FIG. 6 illustrates the positional relation of the members 2A and 2B at the time when 611c—612c portion as shown in FIG. 7 receives them at the uppermost position of the roller 6A.

As is known from FIGS. 5 and 6, the width of the overlapped portion is continuously changed.

A pressing roller 6B is provided above the groove 61 of the receiving roller 6A, and the overlapped portion is pressed to the receiving roller 6A by the roller 6B to be joined.

The receiving roller 6A is made sufficiently large as compared with the pressing roller 6B. For example, the diameter of the receiving roller 6A is about 200 mm and the diameter of the pressing roller 6B is about 50 mm.

To the receiving surface of the guide groove 61 is given lubricity by coating the receiving surface with Teflon, or the like. The extruding speed and the rotating speed of the rollers are controlled by means of a synchronous control device 8 as shown in FIG. 3.

The joined members 2A and 2B having the seal lip of which the length is adequately changed, are fed to a vulcanizing bath 7 by means of a conveyor belt or the like, and are vulcanized therein. As a result, a desired weather strip can be obtained.

According to the first method of the present invention, each of the two members 2A and 2B, each having a uniform sectional shape, is extruded, and then, the sectional shape of the weather strip is changed. Therefore, it is unnecessary to adjust the supply of the rubber material in the extruding process.

Furthermore, according to the first method of the present invention, the position of each of the two extruded members is changed in a direction opposed to each other and the obtained overlapped portion is pressed and joined. Therefore, any complex-structured producing device is not required, and accordingly the production of the weather strip can be easily performed.

The first method according to the present invention is not limited to the weather strip of the above described embodiment. The present invention can be applied to another type of the weather strip having another sectional shape by selecting two members composing the weather strip and an overlapped portion thereof.

A second method according to the present invention will be explained in accordance with the embodiment where the weather strip 2 mounted along the door frame 1 as shown in FIGS. 1 and 2, is produced.

As shown in FIGS. 1 and 2, the weather strip 2 is an extruded body made of sponge rubber, which is provided with a main body portion 21 including a hollow seal portion, and a seal lip 22. The main body portion 21 is retained by an outer peripheral surface 11 of a door frame 1. The length of the seal lip 22 is changed in accordance with the change of the height of the projecting edge 12 of the door frame 1. The second method for producing this weather strip will be explained with reference to FIGS. 8 through 14.

Figure 8:
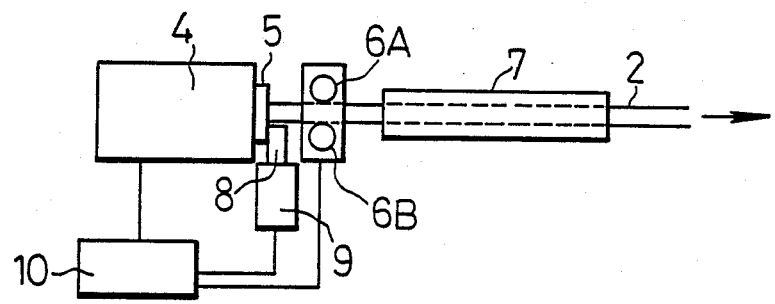
FIGS. 8 through 14 illustrate a second method according to the present invention.
Figure 10:
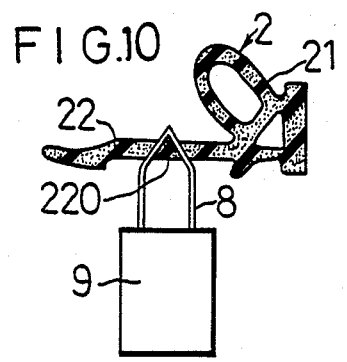
Figure 11:
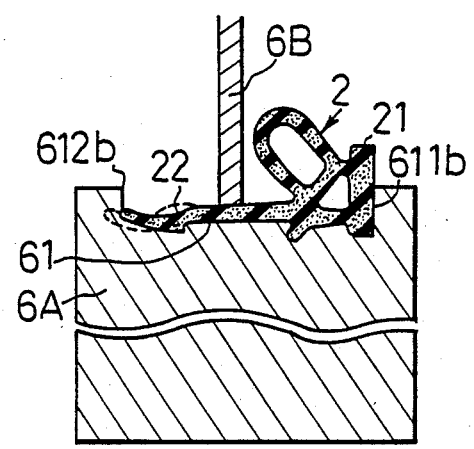
Figure 12:
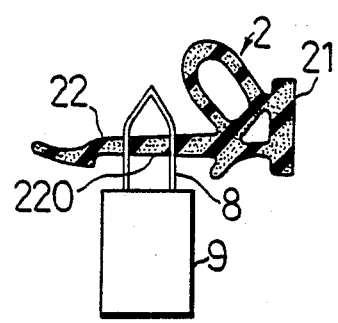
Figure 13:
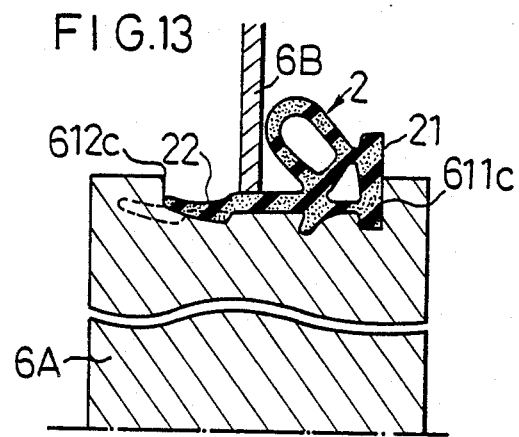

The weather strip 2 is extruded out of an extrusion head 5 of an extruder 4 as shown in FIG. 8, and the seal lip 22 is cut away at its intermediate position by a predetermined width by means of a cutter 8 (FIGS. 10 and 12). Then, the separated ends are joined by means of rollers 6A and 6B as shown in FIG. 11 and 13, and the joined weather strip 2 is fed to a vulcanizing bath 7 as shown in FIG. 8.

Figure 9:
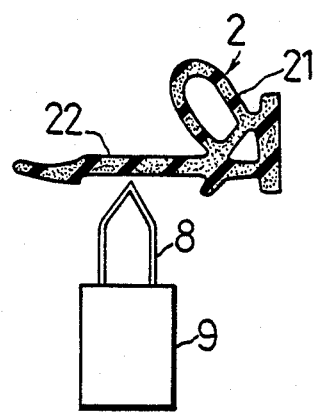

The weather strip 2 extruded from the extrusion head 5 is provided with a main body portion 21 including the hollow seal portion and the seal lip 22 straightly extending from the main body portion 21, and has a uniform sectional shape (FIG. 9).

A cutter 8 which is moved upward and downward by means of a cutter driving device 9, is provided under the seal lip 22 of the extruded weather strip 2. The cutter 8 has a cutting edge of a triangular section. When the cutter 8 ascends as shown in FIG. 10, the intermediate portion of the seal lip 22 is cut away. The width of the cut away portion 220 is changed in accordance with the vertical position of the cutter 8. Consequently, the weather strip 2 provided with the cut seal lip 22, of which the length is continuously changed, is fed to the receiving roller 6A.

Figure 14:
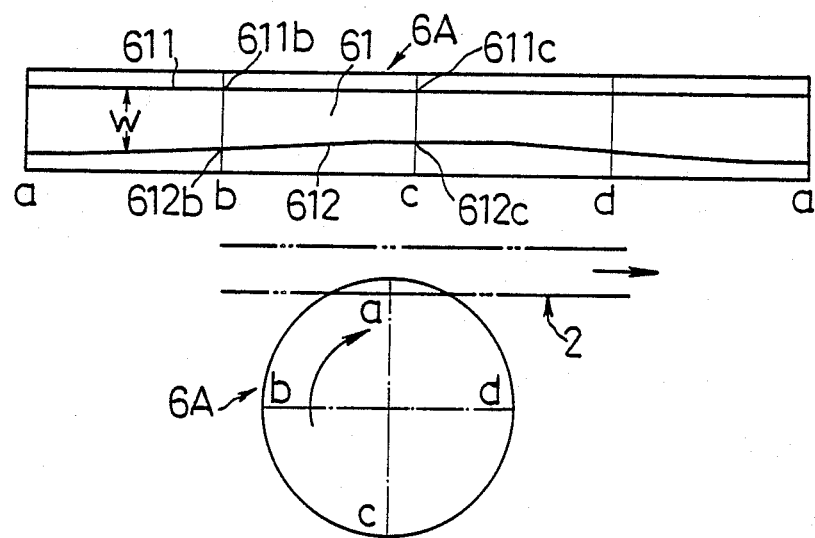

As shown in FIG. 14, a guide groove 61 for receiving the cut weather strip 2 is provided in the peripheral surface of the roller 6A. The width(W) of the guide groove 61 is changed in response to the change of the width of the desired weather strip. In FIG. 14, the reference characters a through d represent the positions on the outer periphery of the receiving roller 6A.

One side edge 611 of the guide groove 61 straightly extends, and the other side edge 612 curves approaching the side edge 611 and going away therefrom.

The weather strip 2 subjected to the cutting process is received by the groove 61 of the rotating receiving roller 6A.

The main body portion 21 is received on the side of the side edge 611 and the seal lip 22 is received on the side of the side edge 612 at the uppermost position of the roller 6A. The width(W) of the groove 61 at the uppermost position of the roller 6A is continuously changed due to the rotation of the roller 6A.

The extruding speed of the weather strip, the vertical position of the cutter 8 and the rotating speed of the receiving roller 6A are controlled by a synchronous control device 10 shown in FIG. 8, so that the width of the weather strip of which the seal lip is partially or totally cut agrees to the width of the groove of the roller 6A at the uppermost position of the roller 6A. This results in that a separated end of the main body portion 21 of the weather strip comes in contact with an opposed separated end of the seal lip 22 when the cut weather strip is received by the guide groove 61.

A pressing roller 6B is provided directly above the receiving roller 6A. The contact portion of the main body portion 21 and the seal lip 22 is pressed by means of the pressing roller 6B so as to be joined to each other.

FIG. 9 illustrates the state where the seal lip 22 of the extruded weather strip 2 is fed above the cutter 8. FIG. 10 illustrates the state where the seal lip 22 is cut. FIG. 11 illustrates the state where the cut and separated weather strip 2 is received at the position b (FIG. 14) of the receiving roller 6A so that separated ends are come in contact with each other, and the contact portion is pressed by the pressing roller 6B to be joined to each other, FIG. 12 is the state where the seal lip 22 is largely cut off by the cutter 8 ascending from the position shown in FIG. 10, and FIG. 13 illustrates the state where the weather strip 2 which is cut and separated in the state of FIG. 12 is received at the position c (FIG. 14) of the receiving roller 6A, the separated ends are come in contact with each other, and the contact portion is pressed by the pressing roller 6B to be joined to each other.

The receiving roller 6A is made sufficiently large as compared with the roller 6B. The diameter of the receiving roller 6A is about 200 mm, and the diameter of the pressing roller 6b is about 50 mm. And the receiving surface of the guide groove 61 is coated with Teflon so as to have lubricity.

The weather strip 2 of which the separated ends are joined to each other by means of the receiving roller 6A and the pressing roller 6B is fed to a vulcanizing bath 7 and vulcanized therein. As a result, the desired weather strip is obtained.

According to the second method of the present invention, the extruded body has a uniform sectional shape. Therefore, the extruding amount of the material is not required to be changed in accordance with the change of the sectional shape.

After the extruding process, unnecessary portion is cut away and the separated ends are joined to each other, whereby the weather strip provided with the seal lip of which the length is continuously changed, can be produced easily.

What is claimed is:

1. A method for producing a weather strip of which the sectional shape is continuously changed in its longitudinal direction, comprising the steps of:
    simultaneously extruding two rubber members, each having a uniform sectional shape in each longitudinal direction, so as to be close to and parallel with each other;
    overlapping opposed side portions of said two extruded rubber members with the width of an overlapped portion of said two rubber members continuously changed while feeding said two extruded rubber members;
    joining said overlapped portion by pressure welding to obtain a joined weather strip of which the sectional shape is continuously changed in its longitudinal direction; and
    feeding said joined weather strip into a vulcanizing bath to be vulcanized.

2. A method according to claim 1, wherein said two rubber members are extruded out of two outlet ports formed in an extrusion head of an extruder so as to be close to each other.

3. A method according to claim 2, wherein said overlapping step is performed by a receiving roller disposed in front of said extruding outlets, which is provided with a guide groove in its outer periphery, the width of said guide groove is smaller than the total width of said two rubber members and changes in the peripheral direction of said roller thereby to overlap said opposed side portions of said two extruded rubber members with each other while feeding said two extruded rubber members guided by said guide groove of said receiving roller.

4. A method according to claim 3, wherein said joining step is performed by a pressing roller disposed directly above said receiving roller thereby to press said overlapped portion of said two extruded rubber members within said guide groove of said receiving roller.

5. A method according to claim 2, wherein one of said two rubber members, which is extruded from one of said two outlet ports, has a shape corresponding to a main body portion including a root portion of a seal lip of the weather strip, and the other one of said two rubber members, which is extruded from the other one of said two outlet ports, has a shape corresponding to the seal lip of the weather strip, and said two extruded rubber members are overlapped so as to composed the seal lip.

6. A method for producing a weather strip having a sectional shape which continuously changes along a longitudinal direction thereof, comprising the steps of:
    extruding a weather strip having a uniform sectional shape along a longitudinal direction with an extruder;
    continuously cutting off a transversely intermediate portion from the extruded weather strip having a width which is continuously changed along the longitudinal direction of said extruded weather strip while feeding the extruded strip so as to separate the extruded weather strip along a longitudinal direction thereof;
    successively touching and joining separated opposed side surfaces of said cut and separated weather strip to obtain a joined weather strip having a sectional shape which continuously changes; and
    feeding the joined weather strip into a vulcanizing bath to be vulcanized.

7. A method according to claim 6, wherein said cutting off step is performed by vertically moving a cutter having a cutting edge of a triangular section, which is disposed in a feeding route of the extruded weather strip.

8. A method according to claim 6, wherein said touching step is performed by feeding the separated weather strip to a guide groove formed in an outer peripheral surface of a rotating receiving roller, so that the separated opposed side surfaces of the separated weather strip are opposed to each other, and the width of said guide groove is continuously changed in response to the change of the width of the weather strip of which the sectional shape is changed.

9. A method according to claim 8, wherein said joining step is performed by pressing touched opposed side surfaces of said separated weather strip within said guide groove by means of a pressing roller disposed directly above said receiving roller.

10. A method according to claim 6, wherein the extruded weather strip is provided with a main body portion and a seal lip projecting from said main body portion, and is continuously cut off in the intermediate portion of the seal lip.

* * * * *